United States Patent
Senda

(10) Patent No.: US 6,801,259 B2
(45) Date of Patent: *Oct. 5, 2004

(54) CONTROL APPARATUS FOR AN OPTICAL DEVICE

(75) Inventor: Akira Senda, Tokyo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/925,085

(22) Filed: Sep. 8, 1997

(65) Prior Publication Data

US 2002/0122122 A1 Sep. 5, 2002

(30) Foreign Application Priority Data

Sep. 9, 1996 (JP) .............................................. 8-260214

(51) Int. Cl.[7] .............................................. H04N 5/232
(52) U.S. Cl. ...................................................... 348/345
(58) Field of Search ................................. 348/345, 358, 348/357, 211, 211.99, 211.3, 211.6, 211.14; 396/85, 86, 76–79, 131, 137, 298

(56) References Cited

U.S. PATENT DOCUMENTS

| 4,404,595 A | 9/1983 | Ushiro et al. ............... 358/227 |
| 4,942,417 A | * 7/1990 | Miyazawa et al. .......... 396/131 |
| 5,206,732 A | * 4/1993 | Hudson ....................... 348/211 |
| 5,227,829 A | * 7/1993 | Imanari et al. ............. 396/131 |

FOREIGN PATENT DOCUMENTS

| EP | 0 405 051 | 1/1991 |
| EP | 0 439 219 | 7/1991 |

* cited by examiner

Primary Examiner—Wendy R. Garber
Assistant Examiner—Rashawn N. Tillery
(74) Attorney, Agent, or Firm—Fitzpatrick, Cella, Harper & Scinto

(57) ABSTRACT

A control apparatus for an optical device including a lens system having a moving lens and a camera to which the lens system is attached, includes a first control signal output unit including a first operation member and outputting a first control signal to control a movement of the moving lens in accordance with an operation of the first operation member, where the first control signal output unit is electrically connected to the lens system, and a second control signal output unit including a second operation member and outputting a second control signal to control a movement of the moving lens in accordance with an operation of the second operation member, where the second control signal output unit is electrically connected to the camera, and the second control signal is output to the lens system through the camera. The apparatus further includes a first detection unit that detects the first control signal, a second detection unit that detects the second control signal, a selection unit that selects one of the first and second control signals on the basis of output signals from the first and second detection units, and a driving unit that drives the moving lens on the basis of one of the first and second control signals selected by the selection unit.

48 Claims, 8 Drawing Sheets

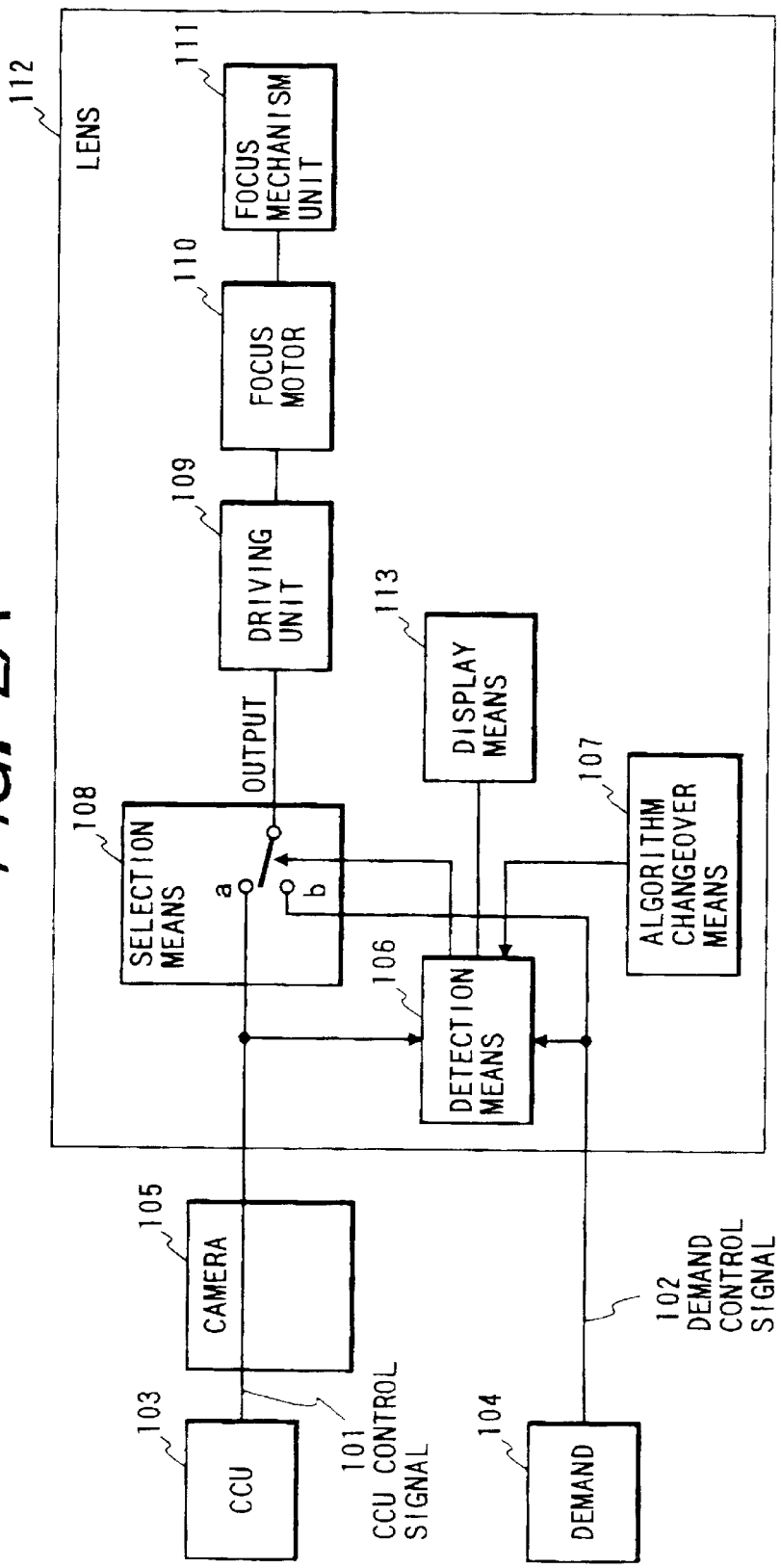

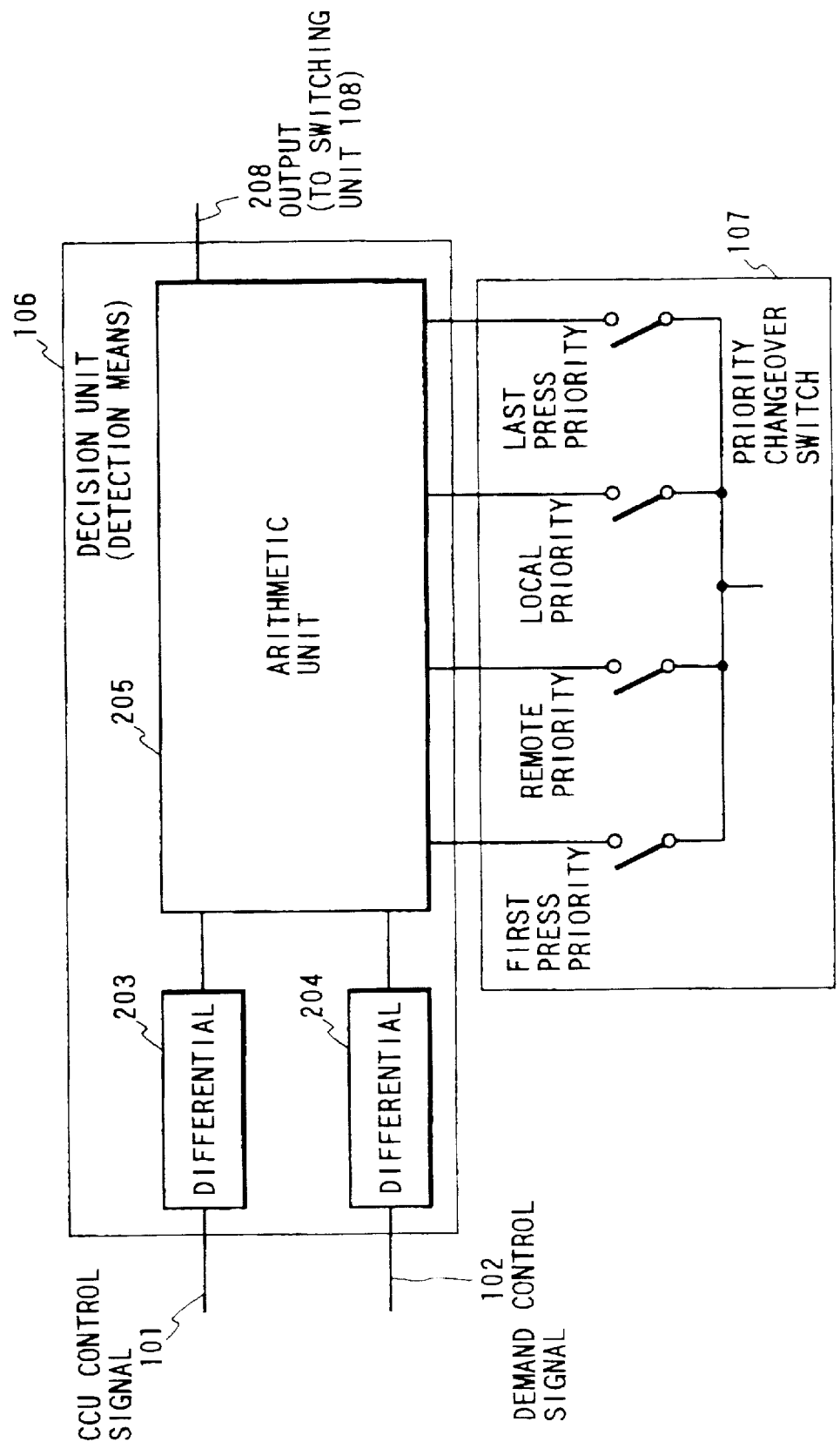

CONTROL APPARATUS FOR AN OPTICAL DEVICE

BACKGROUND OF THE INVENTION

1. Field of the Invention

The present invention relates to an image pickup apparatus and a phototaking lens used therein and, more particularly, to an image pickup apparatus such as a TV camera which is suitably used to attain focusing of the phototaking lens by selecting a control signal (operation signal) from a focus demand attached to the phototaking lens or a camera control unit (CCU) mounted on the camera body.

2. Related Background Art

The conventional methods of manual focusing (to be referred to as the "focus function" hereinafter) of a phototaking lens include the method of manually operating the focus ring (which is directly performed by the hand of a cameraman) and the method of electrically operating the focus mechanism of the phototaking lens by using an actuator such as a motor. When the focus mechanism of the phototaking lens is to be electrically operated in a TV camera or the like, focusing is directly performed from the phototaking lens side, or focusing is performed on the CCU (Camera Control Unit) mounted in a relay station electrically connected to the phototaking lens.

FIG. 8 is a block diagram for explaining focusing to be performed in a conventional TV camera.

Referring to FIG. 8, focusing of a phototaking lens 901 is performed from a demand 903 connected to the phototaking lens 901 or from a control knob 905 on a CCU 904 at the relay station 902 side. An R/L switch 906 on the CCU 904 is operated to choose between using the demand 903 of the phototaking lens 901 and using the control knob 905 of the CCU 904. "R" of the R/L switch 906 represents remote control, i.e., an operation from the control knob 905 of the CCU 904. "L" of the R/L switch 906 represents local control, i.e., an operation from the demand 903 connected to the phototaking lens 901.

In the image pickup apparatus having a conventional focus mechanism, the R/L switch on the CCU is operated to switch the focusing operation between the demand operation of the phototaking lens and the CCU. This arrangement poses the following problem.

Assume that a TV crew is shooting for a relay broadcast of a golf tournament, while the phototaking lens is set near the green of the 18$^{th}$ hole, and the CCU is mounted in a relay car near the club house. Normally, the cameraman who operates the phototaking lens performs focusing by operating the demand connected to the phototaking lens while watching the TV monitor. In this case, focusing is performed when the R/L switch of the CCU is set at "L". In some cases, however, an operator performs fine focusing by using the CCU in the relay car while watching the monitor. In this case, focusing is performed after the R/L switch of the CCU is switched from "L" to "R". If, however, the operator forgets to switch the R/L switch back from "R" to "L" after focusing with the CCU is complete, the cameraman cannot perform focusing at the phototaking lens side, which may pose a problem in shooting a TV program. In practice, the cameraman and the staff in the relay car exchange information through a network, such as an intercom, and hence serious trouble is unlikely to occur. This is, nevertheless, a drawback in terms of the utility of the photographing equipment system.

SUMMARY OF THE INVENTION

It is an object of the present invention to provide an image pickup apparatus suited for a TV camera, in particular, and a phototaking lens used therein, which can smoothly and reliably perform focusing and zooming of the phototaking lens by using a detection means for detecting the operation states of the demand (focus demand) of the phototaking lens and the control knob of a CCU and automatically switching focusing and zooming control on the basis of a signal from the detection means, without using an R/L switch in the CCU of the relay station, as has been used in the prior art.

According to the present invention, there is provided an image pickup apparatus for driving a moving lens in accordance with first and second command signals, comprising first detection means for detecting the first command signal, second detection means for detecting the second command signal, selection means for selecting one of the first and second command signals on the basis of output signals from the first and second detection means, and driving means for driving the moving lens on the basis of the command signal selected by the selection means.

The selection means includes a plurality of algorithms. The apparatus includes a setting means for selectively setting these algorithms. The selection means selects a command signal in accordance with the algorithm set by the setting means.

The above and other objects, features, and advantages of the present invention will be apparent from the following detailed description in conjunction with the accompanying drawings and the appended claims.

BRIEF DESCRIPTION OF THE DRAWINGS

FIGS. 2A and 2B are block diagrams showing the detailed arrangement of the main part of the present invention;

DETAILED DESCRIPTION OF THE PREFERRED EMBODIMENTS

Figure 1:
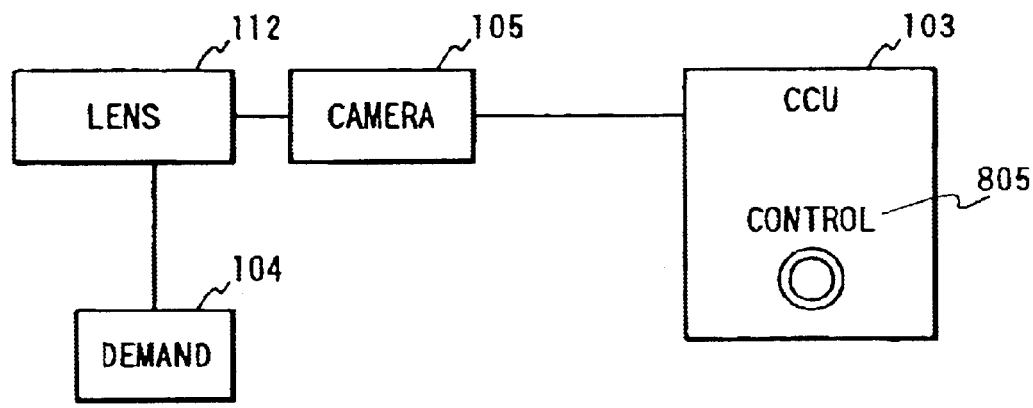
FIG. 1 is a block diagram showing the overall arrangement of an image pickup apparatus according to the present invention.
Figure 8:
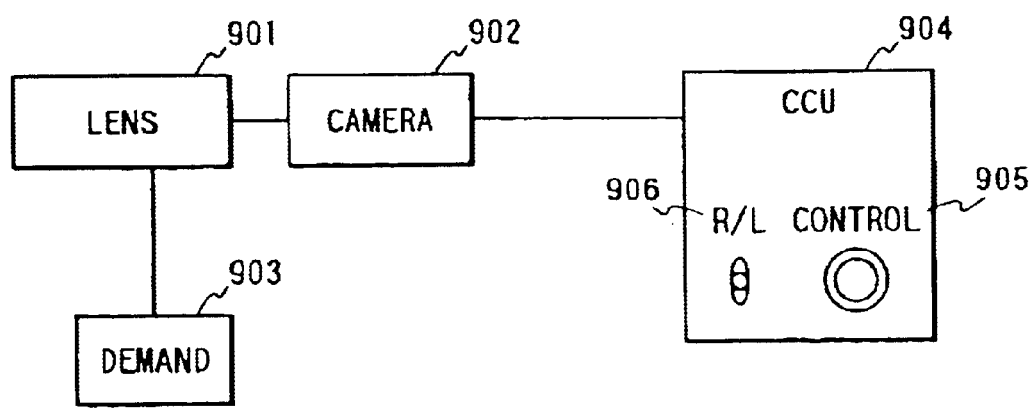
FIG. 8 is a block diagram showing the main part of a conventional image pickup apparatus.

FIG. 1 is a block diagram showing the main part of the first embodiment of the present invention. FIGS. 2A and 2B are enlarged views for explaining a part of the arrangement in FIG. 1. FIGS. 3 to 7 are flow charts showing the operations of the first embodiment of the present invention.

Referring to FIGS. 1 and 2A, a CCU control signal 101 from a camera control unit (CCU) 103 is input to a decision unit (detection means) 106 of a phototaking lens 112 through a camera (camera body) 105, and is also input to a terminal a of a switching unit (selection means) 108. Similarly, a demand control signal 102 output from a demand (focus demand) 104 (connected to the phototaking lens 112) on the basis of an operation performed by a cameraman is input to the decision unit 106 of the phototaking lens 112, and is also input to a terminal b of the switching unit 108. An output from a priority changeover switch (algorithm changeover means) 107 is input to the decision unit 106, and is further output from the decision unit 106 to the switching unit 108. only the signal, of the CCU control signal 101 and the demand control signal 102 input to the switching unit 108, which is selected by the decision unit 106 is output from the switching unit 108 to a driving unit 109 for driving a focus motor 110. The focus motor 110 finally drives a focus mechanism unit 111 of the phototaking lens 112 on the basis of the signal from the driving unit 109.

A display means 113 displays the type of algorithm designated by the priority changeover switch 107. In this case, the driving unit 109, the focus motor 110, and the focus mechanism unit 111 constitute one element of the focus driving mechanism.

The decision unit (detection means) 106 has a plurality of algorithms for selecting the CCU control signal 101 or the demand control signal 102. For example, the above-mentioned selection means has an algorithm for preferentially selecting a control signal from either the focus demand or the CCU when control signals are simultaneously output from both the focus demand and the CCU.

The priority changeover switch (algorithm changeover means) 107 designates one of the algorithms set in the decision unit 106. The decision unit (detection means) 106 includes a first detection means (203, 205) for detecting the demand control signal 102 from the focus demand 104 and a second detection means (204, 205) for detecting the CCU control signal 101 from the CCU 103.

FIG. 2B shows the detailed arrangement of the decision unit (detection means) 106 in FIG. 2A.

To detect operation of a control knob 805 on the CCU 103 in FIG. 1 as a change in the CCU control signal 101 in FIG. 2B, the CCU control signal 101 is input to the differential (difference) block 203 of the decision unit 106. Similarly, to detect operation of the demand 104 connected to the phototaking lens 112 in FIG. 1 as a change in the demand control signal 102 in FIG. 2B, the demand control signal 102 is input to the differential (difference) block 204 of the decision unit 106.

Outputs from the differential blocks 203 and 204 are input to the arithmetic unit 205. In this case, the differential block 203 and the arithmetic unit 205 form one element of the first detection means. The differential block 204 and the arithmetic unit 205 makes up on element of the second detection means.

A priority changeover switch 206 is connected to the arithmetic unit 205, which has a plurality of algorithms for various focusing operations. After performing the processing shown in FIGS. 3 to 7, the arithmetic unit 205 determines whether to use a control signal from the CCU 103 or a control signal from the demand 104 to perform driving control of the focus motor 110, and outputs the determination result to the switching unit 108.

Figure 3:
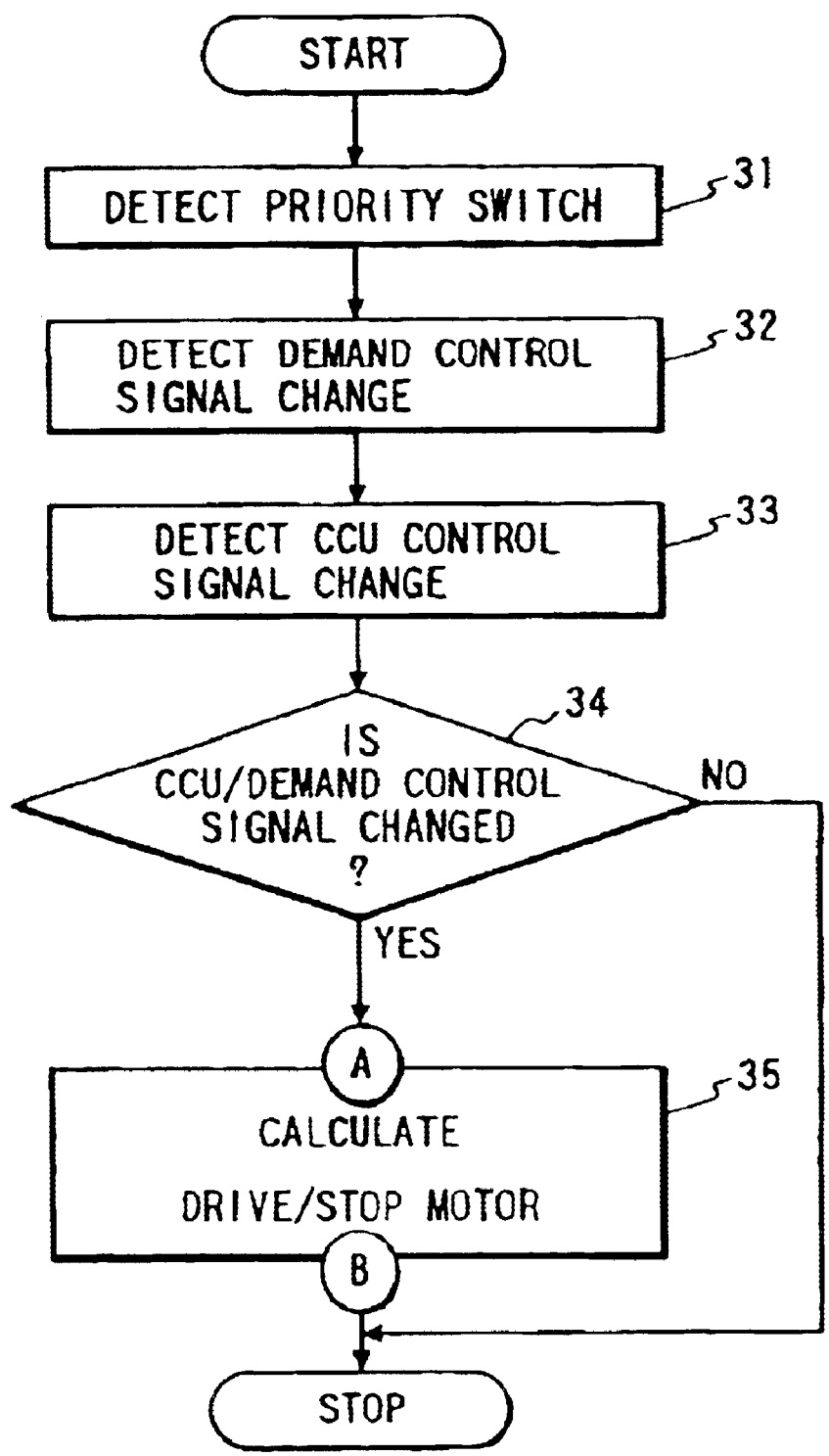
FIG. 3 is a flow chart showing the overall operation of the present invention.

FIG. 3 is a flow chart showing the overall control procedure in this embodiment. Note that the processing in steps 31 to 34 is performed by the decision unit 106 in FIG. 2A, and the processing in step 35 is performed by the decision unit 106, the switching unit 108, the driving unit 109, the focus motor 110, and the focus mechanism unit 111 in FIG. 2A.

In step 31, the mode selected by the priority changeover switch 107 in FIG. 2A is detected. In step 32, a change in the demand control signal 102 from the demand 104 in FIG. 2A is detected by using the differential block 204 of the decision unit 106 in FIG. 2B. In step 33, a change in the CCU control signal 101 from the CCU 103 is detected by using the differential block 203 of the decision unit 106 in FIG. 2B. The processings in steps 32 and 33 are periodically performed by starting a timer or the like at the start of this flow chart. In step 34, it is checked, on the basis of the control signal detection results in steps 32 and 33, whether at least one of the signals has changed. If one or both of the control signals have changed, YES is obtained in step 34. In step 35, a calculation is performed, and then the motor is driven and/or stopped in accordance with the calculation result. Thereafter, the procedure in FIG. 3 stops. If it is determined in step 34 that neither the demand control signal 102 nor the CCU control signal 101 have changed, NO is obtained in step 34. As a result, the procedure in FIG. 3 stops.

If YES is obtained in step 34 in FIG. 3, one of the operations shown in FIGS. 4 to 7 is performed in step 35 depending on the priority modes described below.

Figure 4:
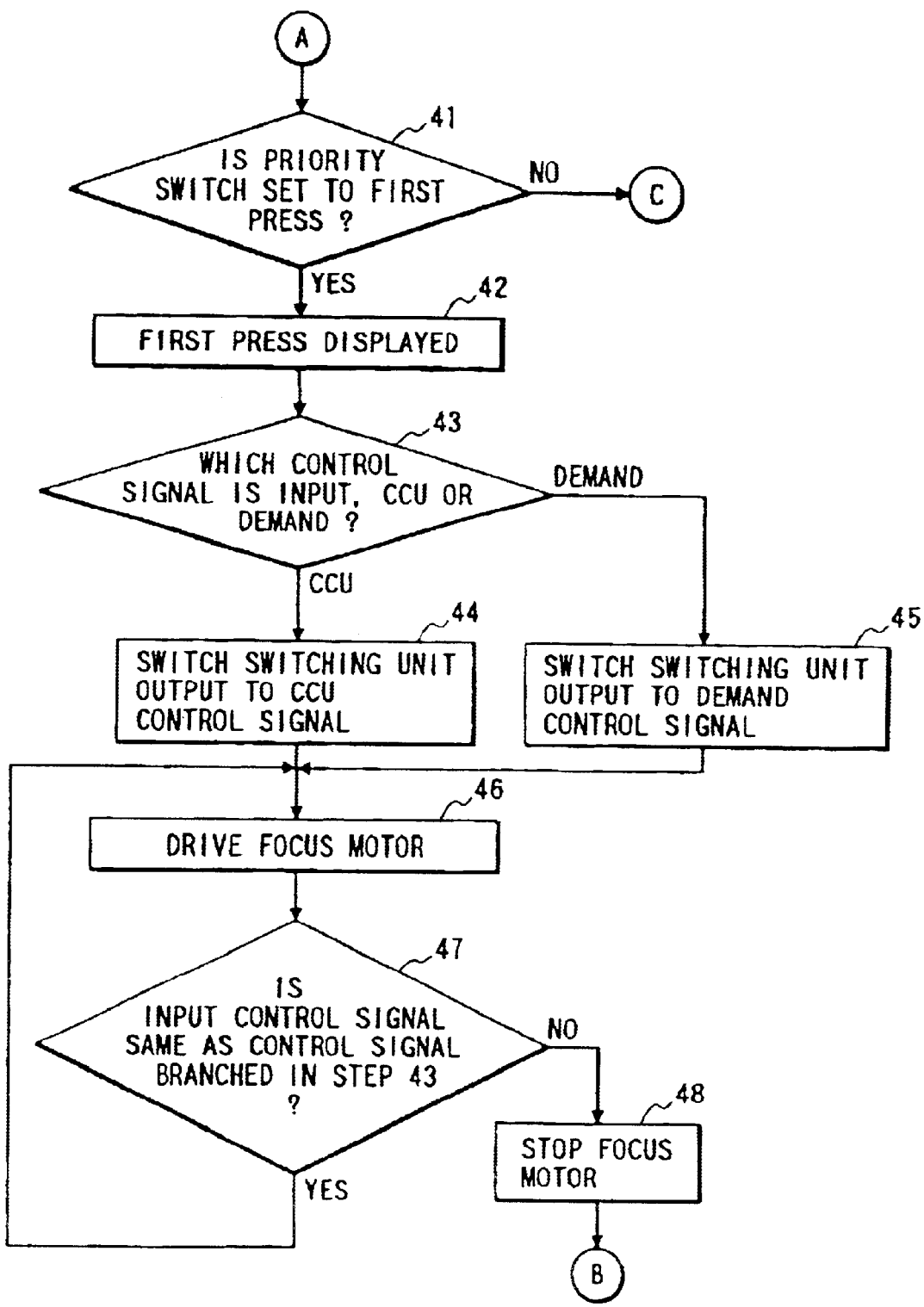
FIG. 4 is a flow chart showing a first press priority procedure in the present invention.

FIG. 4 shows focus control in the first press priority mode.

In this priority mode, priority is given to that one of the focusing operations with the CCU 103 and the demand 104 which is performed first. That is, other operations are ignored until this first focusing operation is complete. Assume that the control knob of the CCU 103 is operated first. In this case, even if the demand 104 connected to the phototaking lens 112 is operated during a CCU operation, this demand operation is ignored. After the operation of the CCU 103 is complete, the operation of the demand 104 is accepted. In this mode, when a CCU operation and a demand operation are to be performed by different operators, the flow branches to the flow chart of FIG. 4, via "A", and one operator is inhibited from performing focusing until the other operator completes focusing. In this case, "A" is a symbol used for convenience in connecting the flow charts to each other.

Referring to FIG. 4, in step 41, it is checked whether the priority changeover switch 107 in FIG. 2B is switched to the first press priority mode. If YES in step 41, information indicating the first press priority mode is displayed on the display means 113 on the phototaking lens 112 or the viewfinder of the camera body in FIG. 2A in step 42. If the priority changeover switch 107 is not switched to the first press priority mode, NO is obtained in step 41, and the flow branches to the flow chart of FIG. 5 through "C". In this case, "C" is a symbol used for convenience in connecting the flow charts to each other.

In step 43, it is checked whether the first signal input to the phototaking lens 112 is sent from the CCU 103 or the demand 104. If it is determined that the signal is sent from the CCU 103, the flow branches to step 44. If it is determined that the signal is sent from the demand 104, the flow branches to step 45. If input signals are simultaneously sent from the CCU 103 and demand 104, the flow branches to a predetermined one of steps 44 and 45.

In step 44, the output of the switching unit 108 in FIG. 2A is switched to the CCU control signal 101. In step 45, the output of the switching unit 108 in FIG. 2A is switched to the demand control signal 102. After step 44 or 45, the focus motor 110 is driven by the driving unit 109 on the basis of the control signal selected by the switching unit 108 in step 46.

The processing in step 47 is periodically performed by starting a timer or the like upon starting step 47.

In step 46, the focus motor 110 is driven. If it is determined in step 47 afterward that the control signal input to the phototaking lens 112 is the same as the signal output in step 43, the focus motor 110 is continuously driven in step 46, and the processing in step 47 is periodically performed.

If it is determined in step 47 that the signal input to the phototaking lens 112 is different from the signal output in step 43, or neither the CCU 103 nor the demand 104 have sent a signal, the flow branches to step 48 to stop the focus motor 110. The flow then returns, via "B", to the flow chart illustrated in FIG. 3.

Figure 5:
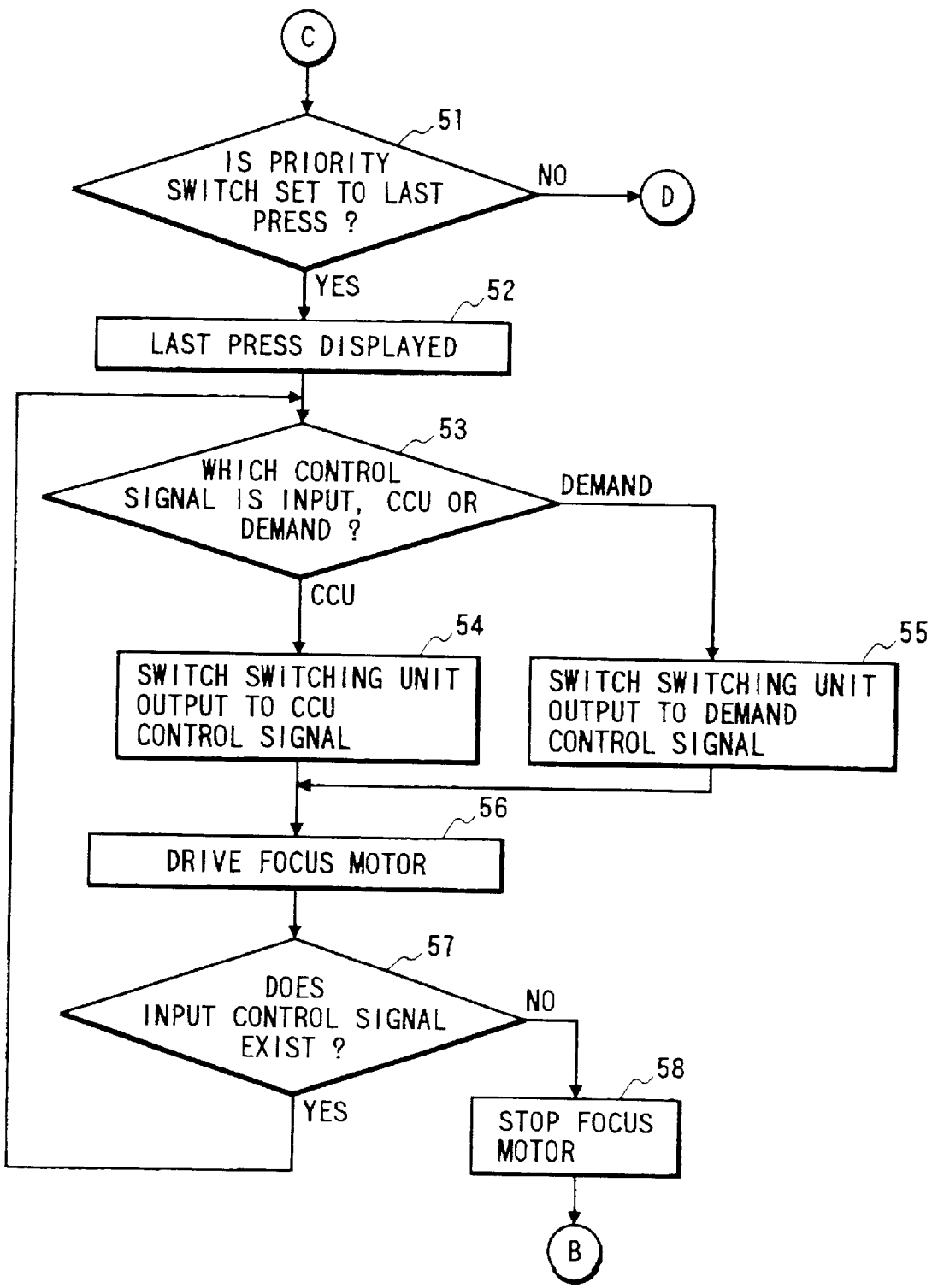
FIG. 5 is a flow chart showing a last press priority procedure in the present invention.

FIG. 5 shows focus control in the last press priority mode.

In this priority mode, regardless of whether focusing is performed first with the CCU 103 or the demand 104 in FIG. 2A, when an operation different from the first operation is performed, the first operation is immediately switched to the second operation. If, for example, the CCU 103 is operated first, and the demand 104 is then operated during the operation of the CCU 103, focusing with the CCU 103 is stopped, and focusing with the demand 104 is started. In this mode, priority is given to an operator who performs focusing last.

Referring to FIG. 5, it is checked in step 51 whether the priority changeover switch 107 in FIG. 2B is switched to the last press priority mode. If YES in step 51, information indicating the last press priority mode is displayed on the display means 113 on the phototaking lens 112 or the viewfinder of the camera in FIG. 2A in step 52. If the priority changeover switch 107 is not switched to the last press priority mode, NO is obtained in step 51, and the flow branches to the flow chart of FIG. 6, via "D". In this case, "D" is a symbol used for convenience in connecting the flow charts to each other.

In step 53, it is checked whether the signal input to the phototaking lens 112 is sent from the CCU 103 or the demand 104. If it is determined that the signal is sent from the CCU 103, the flow branches to step 54. If it is determined that the signal is sent from the demand 104, the flow branches to step 55. If input signals are simultaneously input from the CCU 103 and the demand 104, the flow branches to a predetermined one of steps 54 and 55.

In step 54, the output of the switching unit 108 in FIG. 2A is switched to the CCU control signal 101. In step 55, the output of the switching unit 108 in FIG. 2A is switched to the demand control signal 102. After step 54 or 55, the focus motor 110 is driven by the driving unit 109 on the basis of the control signal selected by the switching unit 108 in step 56.

The processing in step 57 is periodically performed by starting a timer or the like upon starting step 57.

After the focus motor 110 is driven in step 56, it is checked in step 57 whether any control signal is input to the phototaking lens 112. If it is determined that a signal is input from the CCU 103 or the demand 104, the flow branches to step 53. The processing in step 53, step 54 or 55, step 56, and 57 is performed again.

If it determined in step 57 that neither the CCU 103 nor the demand 104 have sent a signal, the flow branches to step 58 to stop the focus motor. The flow then returns, via "B", to the flow chart illustrated in FIG. 3.

In this priority mode, priority is given to focusing with the CCU 103 in FIG. 2A. Even if the demand 104 is operated before this operation is complete, the operation of the demand 104 is ignored. The operation of the demand 104 is accepted only after the operation with the CCU 103 is complete. When the CCU 103 is operated during focusing with the demand 104, focusing is switched to the operation with the CCU 103.

In this remote priority mode, the CCU 103 of the camera is regarded as the main means for focusing, whereas the demand 104 is regarded as an auxiliary means for focusing. For example, this mode is used for a shooting operation using a monitor camera. Focusing of this camera is basically performed by using the CCU set in a monitoring center or the like. For maintenance or the like, however, a demand is mounted on the lens of the monitor camera to check the focusing movement of the lens.

Figure 6:
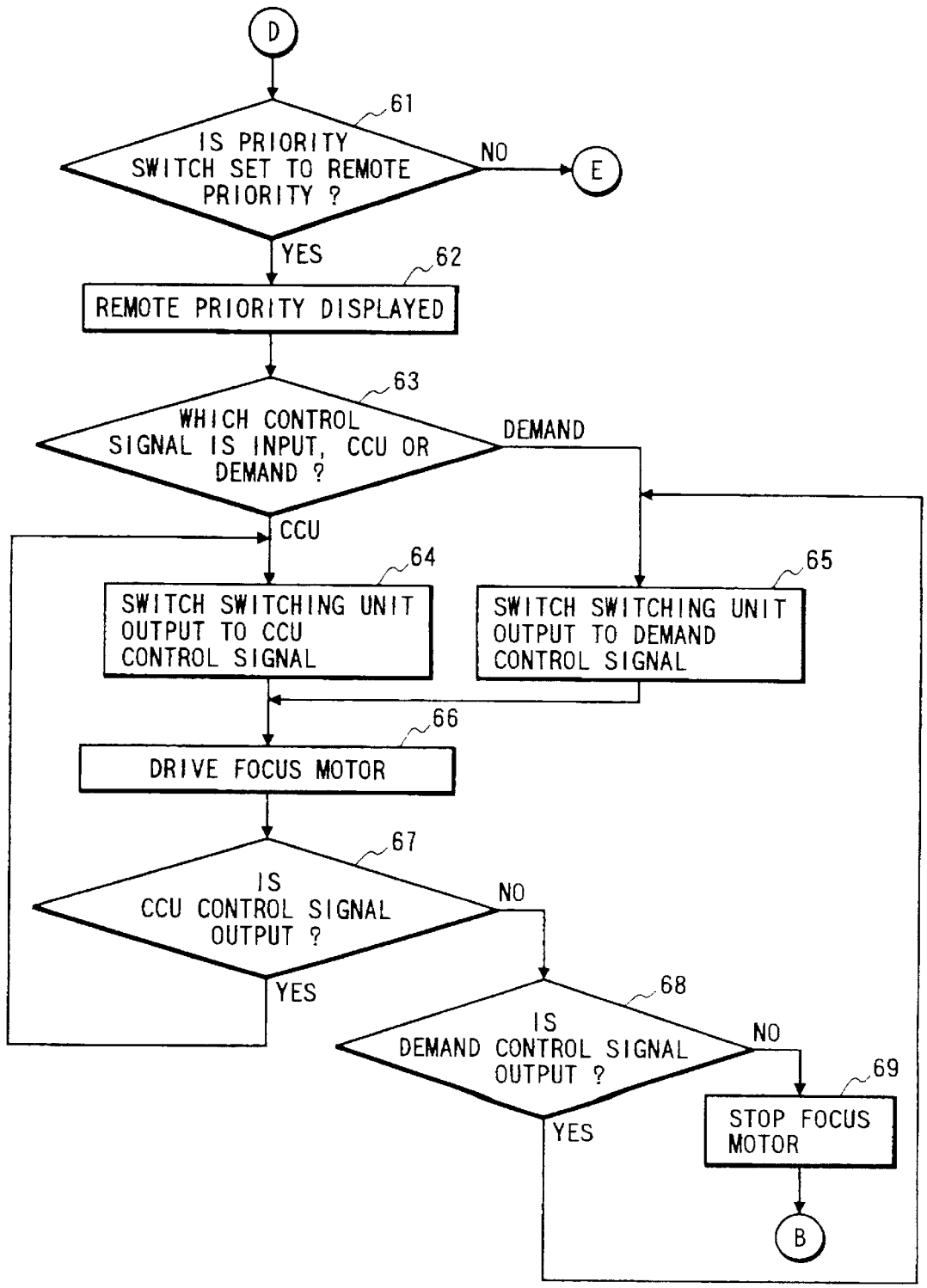
FIG. 6 is a flow chart showing a remote priority procedure in the present invention.

Referring to FIG. 6, it is checked in step 61 whether the priority changeover switch 107 in FIG. 2B is switched to the remote priority mode. If YES in step 61, information indicating the remote priority mode is displayed on the display means 113 on the phototaking lens 112 or the viewfinder of the camera body in FIG. 2A in step 62. If the priority changeover switch 107 is not switched to the remote priority mode, NO is obtained in step 61, and the flow branches to the flow chart of FIG. 7, via "E". In this case, "E" is a symbol used for convenience in connecting the flow charts to each other.

In step 63, it is checked whether the first signal input to the lens is sent from the CCU 103 or the demand 104. If it is determined that the signal is sent from the CCU 103, the flow branches to step 64. If it is determined that the signal is sent from the demand 104, the flow branches to step 65. If it is determined in step 63 that signals are simultaneously input from the CCU 103 and the demand 104, then the flow branches to step 64.

In step 64, the output of the switching unit 108 in FIG. 2A is switched to the CCU control signal 101. In step 65, the output of the switching unit 108 in FIG. 2A is switched to the demand control signal 102. After step 64 or 65, the focus motor 110 is driven by the driving unit 109 on the basis of the control signal selected by the switching unit 108 in step 66.

The processing in step 67 is periodically performed by starting a timer or the like upon starting step 67.

After the focus motor 110 is driven in step 66, it is checked in step 67 whether any control signal is input to the phototaking lens 112. If the signal input to the phototaking lens 112 is sent from the CCU 103, the flow branches to step 64. The processing in steps 66 and 67 is performed again.

If it is determined in step 67 that no signal is input to the CCU 103, the flow branches to step 68.

If it is determined in step 68 that the control signal input to the phototaking lens 112 is sent from the demand 104, the flow branches to step 65. The processing in steps 66 and 67 is then performed again. If it is determined in step 68 that no demand signal is input to the phototaking lens 112, the focus motor is stopped in step 69. The flow then returns, via "B", to the flow chart illustrated in FIG. 3.

Figure 7:
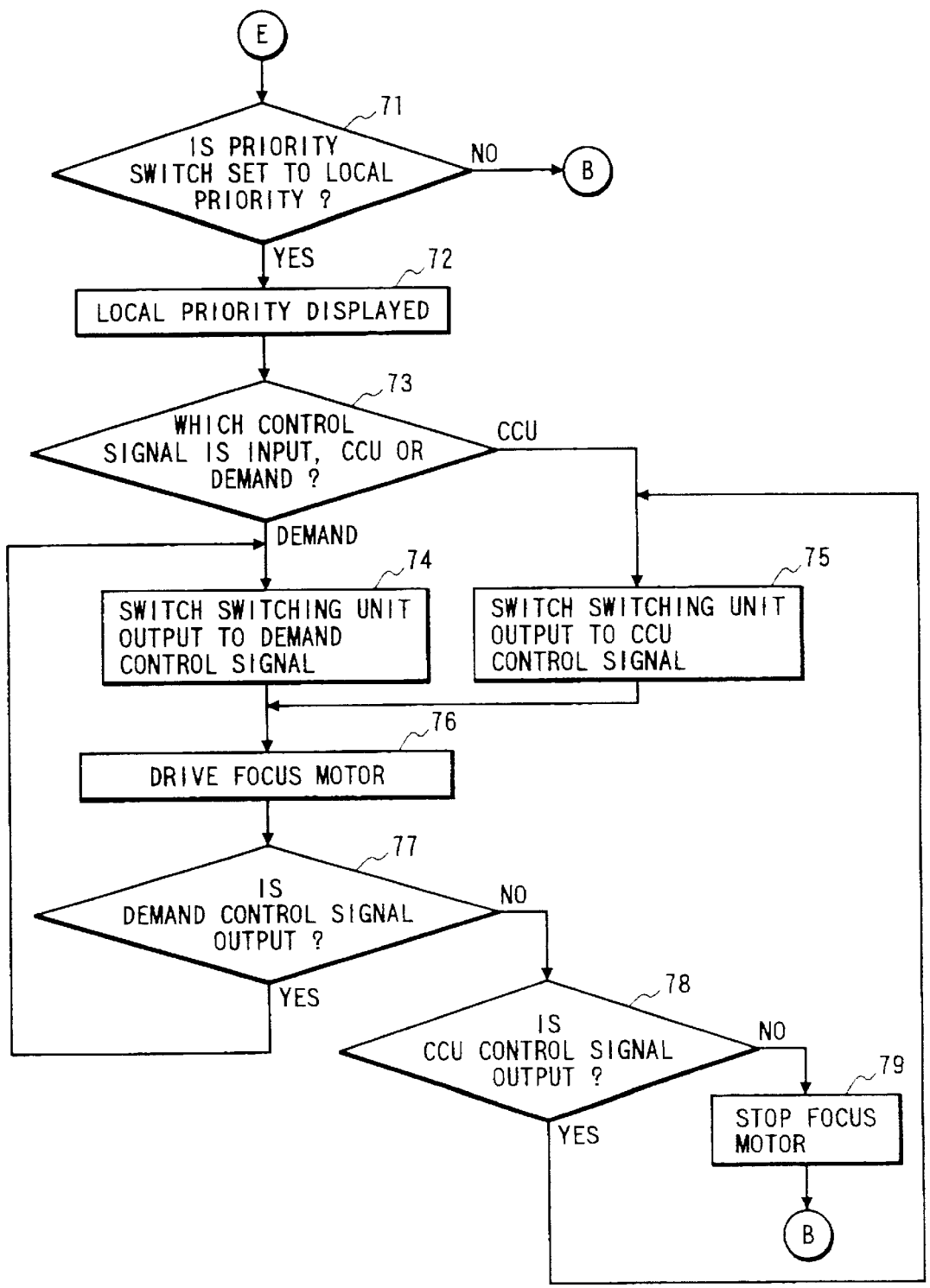
FIG. 7 is a flow chart showing a local priority procedure in the present invention.

FIG. 7 shows focus control in the local priority mode.

In this priority mode, priority is given to focusing with the demand 104 in FIG. 2A. In this mode, even if the CCU 103 is operated before this focusing operation is complete, the operation of the CCU 103 is ignored. The operation of the CCU 103 is accepted only after the operation with the demand 104 is complete. When the operation with the demand 104 is initiated during focusing with the CCU 103, focusing is switched to focusing with the demand 104.

In this local priority mode, the demand 104 of the phototaking lens is regarded as the main means for focusing, whereas the CCU 103 is regarded as an auxiliary means for focusing. In this mode, the cameraman, who manipulates the lens, normally performs focusing with the demand. When the cameraman moves away from the TV camera with the TV camera and the phototaking lens being fixed, focusing can be performed with the CCU set in a relay car or the like.

Referring to FIG. 7, it is checked in step 71 whether the priority changeover switch 107 in FIG. 2B is switched to the local priority mode. If YES in step 71, information indicating the local priority mode is displayed on the display means 113 on the phototaking lens 112 or the viewfinder of the camera body in FIG. 2A in step 72. If the priority changeover switch 107 is not switched to the local priority mode, NO is obtained in step 71. In this case, the flow branches, via "B", to the step of stopping the focus motor in FIG. 3 without driving the focus motor.

In step 73, it is checked whether the first signal input to the lens is sent from the CCU 103 or the demand 104. If it is determined that the signal is sent from the demand 104, the flow branches to step 74. If it is determined that the signal is sent from the CCU 103, the flow branches to step 75. If it is determined in step 73 that signals are simultaneously input from the CCU 103 and the demand 104 to the lens, the flow branches to step 74.

In step 74, the output of the switching unit 108 in FIG. 2B is switched to the demand control signal 102. In step 75, the output of the switching unit 108 in FIG. 2B is switched to the CCU control signal 101. After step 74 or 75, the focus motor 110 is driven by the driving unit 109 on the basis of the control signal selected by the switching unit 108 in step 76.

The processing in step 77 is periodically performed by starting a timer or the like upon starting step 77.

After the focus motor 110 is driven in step 76, it is checked in step 77 whether any control signal is input to the phototaking lens 112. If the signal input to the phototaking lens 112 is sent from the demand 104, the flow branches to step 74. The processing in steps 76 and 77 is then performed again.

If it is determined in step 77 that no signal is sent from the demand 104, the flow branches to step 78. If it is determined in step 78 that the control signal input to the phototaking lens 112 is sent from the CCU 103, the flow branches to step 75. The processing in steps 76 and 77 is then performed again. If it is determined in step 78 that no CCU control signal is input to the phototaking lens 112, the focus motor is stopped in step 79.

In all the focus modes in FIGS. 4 to 7, if there is only a demand, focusing can be performed by using only the demand. If there is only a CCU, focusing can be performed by using only the CCU.

In the above description, a focus command signal is used as the command signal. Instead of this signal, however, a zoom command signal or an aperture control signal may be used.

As has been described above, according to the present invention, there is provided an image pickup apparatus suited for a TV camera, in particular, and a phototaking lens used therein, which can smoothly and reliably perform focusing and zooming of the phototaking lens by using a detection means for detecting the operation states of the demand (focus demand) of the phototaking lens and the control knob of a CCU on the camera body side and automatically switching focusing and zooming on the basis of a signal from the detection means, without using the R/L switch in the CCU, as used in the prior art.

According to the present invention, by detecting whether focusing is being done with the focus demand or the CCU in accordance with a change in a focus control signal from the focus demand or the CCU, in particular, operations with the demand of the phototaking lens and the CCU of the camera can be smoothly switched without using the R/L switch of the CCU of the camera.

By selectively operating the priority changeover switch mounted in the phototaking lens, one of various operation modes, namely the first press priority mode, the last press priority mode, the remote priority mode, and the local priority mode, can be selected.

An image pickup apparatus and a phototaking lens used therein which can perform focusing of the phototaking lens by using only a focusing controller can be obtained even if the controller includes only a demand attached to the phototaking lens or a CCU mounted on the camera.

What is claimed is:

1. A control apparatus for an optical device including a lens system having a moving optical member and a camera to which the lens system is attached, comprising:
   a first control signal output unit including a first operation member and outputting a first control signal to control a movement of the moving optical member in accordance with an operation of said first operation member, said first control signal output unit being electrically connected directly to the lens system;
   a second control signal output unit including a second operation member and outputting a second control signal to control a movement of the moving optical member in accordance with an operation of said second operation member, said second control signal output unit being electrically connected to the camera, the second control signal being output to the lens system through the camera;
   first detection circuitry that detects the first control signal;
   second detection circuitry that detects the second control signal;
   a selection unit that selects one of the first and second control signals, on the basis of output signals from said first detection circuitry and said second detection circuitry; and
   a driving unit that drives the moving optical member on the basis of one of the first and second control signals selected by said selection unit.

2. An apparatus according to claim 1, further comprising a setting unit that sets an algorithm from among a plurality of predetermined algorithms, and wherein said selection unit selects the first or second control signal in accordance with the algorithm set by said setting unit.

3. An apparatus according to claim 2, wherein said selection unit includes an algorithm for giving priority to and selecting the first control signal when the first and second control signals are simultaneously output.

4. An apparatus according to claim 2, wherein said selection unit includes an algorithm for giving priority to and selecting the second control signal when the first and second control signals are simultaneously output.

5. An apparatus according to claim 2, wherein said selection unit includes an algorithm for giving priority to and selecting a control signal which is output first when said first and second control signals are simultaneously output.

6. An apparatus according to claim 1, wherein the moving optical member is a focus lens.

7. An apparatus according to claim 1, wherein the moving optical member is a zoom lens.

8. An apparatus according to claim 6, wherein the first and second control signals are focus lens control signals.

9. An apparatus according to claim 7 wherein the first and second control signals are zoom lens control signals.

10. An apparatus according to claim 2 wherein said selection unit includes an algorithm for driving the moving optical member on the basis of a control signal which is output first when the first and second control signals are simultaneously output, and, in a case where a control signal which is output second is continuously output, for driving the moving optical member on the basis of the control signal output second.

11. An apparatus according to claim 1, wherein the movable optical member is an aperture stop.

12. An apparatus according to claim 1, wherein said moving optical member includes a moving lens.

13. An apparatus according to claim 1, wherein said first operation member is a demand of said moving optical member.

14. A control apparatus for an optical device including a lens system having a moving optical member and a camera to which the lens system is attached, comprising:
  a first control signal output unit including a first operation member and outputting a first control signal to control a movement of the moving optical member in accordance with an operation of said first operation member, said first control signal output unit being electrically connected to the lens system;
  a second control signal output unit including a second operation member and outputting a second control signal to control a movement of the moving optical member in accordance with an operation of said second operation member, said second control signal output unit being electrically connected to the camera, the second control signal being output to the lens system through the camera;
  first detection circuitry disposed in the lens system that detects the first control signal;
  second detection circuitry disposed in the lens system that detects the second control signal;
  a selection unit that selects one of the first and second control signals, on the basis of output signals from said first and second detection circuitry; and
  a driving unit that drives the moving optical member on the basis of one of the first and second control signals selected by said selection unit.

15. An apparatus according to claim 14, further comprising a setting unit that sets an algorithm from among a plurality of predetermined algorithms, and wherein said selection unit selects the first or second control signal in accordance with the algorithm set by said setting unit.

16. An apparatus according to claim 15, wherein said selection unit includes an algorithm for giving priority to and selecting the first control signal when the first and second control signals are simultaneously output.

17. An apparatus according to claim 15, wherein said selection unit includes an algorithm for giving priority to and selecting the second control signal when the first and second control signals are simultaneously output.

18. An apparatus according to claim 15, wherein said selection unit includes an algorithm for giving priority to and selecting a control signal which is output first when said first and second control signals are simultaneously output.

19. An apparatus according to claim 14, wherein the moving optical member is a focus lens.

20. An apparatus according to claim 14, wherein the moving optical member is a zoom lens.

21. An apparatus according to claim 19, wherein the first and second control signals are focus lens control signals.

22. An apparatus according to claim 20, wherein the first and second control signals are zoom lens control signals.

23. An apparatus according to claim 15, wherein said selection unit includes an algorithm for driving the moving optical member on the basis of a control signal which is output first when the first and second control signals are simultaneously output, and, in a case where a control signal which is output second is continuously output, for driving the moving optical member on the basis of the control signal output second.

24. An apparatus according to claim 14, wherein said moving optical member includes a moving lens.

25. An apparatus according to claim 14, wherein said first operation member is a demand of said moving optical member.

26. A control apparatus for an optical device including a lens system having a moving optical member and a camera to which the lens system is attached, comprising:
  a first control signal output unit including a first operation member and outputting a first control signal to control a movement of the moving optical member in accordance with an operation of said first operation member, said first control signal output unit being electrically connected to the lens system;
  a second control signal output unit including a second operation member and outputting a second control signal to control a movement of the moving optical member in accordance with an operation of said second operation member, said second control signal output unit being electrically connected to the camera, the second control signal being output to the lens system through the camera;
  first detection circuitry that detects the first control signal;
  second detection circuitry that detects the second control signal;
  a selection unit disposed in the lens system that selects one of the first and second control signals, on the basis of output signals from said first and second detection circuitry; and
  a driving unit that drives the moving optical member on the basis of one of the first and second control signals selected by said selection unit.

27. An apparatus according to claim 26, further comprising a setting unit that sets an algorithm from among a plurality of predetermined algorithms, and wherein said selection unit selects the first or second control signal in accordance with the algorithm set by said setting unit.

28. An apparatus according to claim 27, wherein said selection unit includes an algorithm for giving priority to and selecting the first control signal when the first and second control signals are simultaneously output.

29. An apparatus according to claim 27, wherein said selection unit includes an algorithm for giving priority to and selecting the second control signal when the first and second control signals are simultaneously output.

30. An apparatus according to claim 27, wherein said selection unit includes an algorithm for giving priority to and selecting a control signal which is output first when said first and second control signals are simultaneously output.

31. An apparatus according to claim 26, wherein the moving optical member is a focus lens.

32. An apparatus according to claim 26, wherein the moving optical member is a zoom lens.

33. An apparatus according to claim 31, wherein the first and second control signals are focus lens control signals.

34. An apparatus according to claim 32, wherein the first and second control signals are zoom lens control signals.

35. An apparatus according to claim 27, wherein said selection unit includes an algorithm for driving the moving optical member on the basis of a control signal which is output first when the first and second control signals are simultaneously output, and, in a case where a control signal which is output second is continuously output, for driving the moving optical member on the basis of the control signal output second.

36. An apparatus according to claim 26, wherein said moving optical member includes a moving lens.

37. An apparatus according to claim 26, wherein said first operation member is a demand of said moving optical member.

38. A control apparatus according to claim 1, wherein said selection unit selects a command signal in accordance with a predetermined algorithm.

39. A control apparatus according to claim 14, wherein said selection unit selects a command signal in accordance with a predetermined algorithm.

40. A control apparatus according to claim 26, wherein said selection unit selects a command signal in accordance with a predetermined algorithm.

41. A lens apparatus comprising:
a moving lens; and
a driving unit that drives said moving lens on the basis of a first control signal directly output to said lens apparatus and a second control signal output to said lens apparatus via a camera,
wherein said lens apparatus is operable in a compatible mode capable of driving said moving lens by both the first control signal and the second control signal, where movement in accordance with one of the first control signal and the second control signal automatically is made prior to movement in accordance with the other one of the first control signal and the second control signal.

42. A lens apparatus according to claim 41, wherein in the compatible mode movement in accordance with the first control signal automatically is made prior to movement in accordance with the second control signal.

43. A lens apparatus according to claim 41, wherein in the compatible mode movement in accordance with the second control signal automatically is made prior to movement in accordance with the first control signal.

44. A lens apparatus according to claim 41, wherein said compatible mode is a first press priority mode, in which movement in accordance with one of the first control signal and the second control signal is automatically made prior to movement in accordance with the other one of the first control signal and the second control signal based on which control signal is first generated.

45. A lens apparatus according to claim 41, wherein said compatible mode is a last press priority mode, in which movement in accordance with one of the first control signal and the second control signal is automatically made prior to movement in accordance with the other one of the first control signal and the second control signal based on which control signal is later generated.

46. A lens apparatus according to claim 41, wherein the first control signal and the second control signal are focus lens control signals.

47. A lens apparatus according to claim 41, wherein the first control signal and the second control signal are zoom lens control signals.

48. An optical apparatus comprising:
a camera; and
a lens apparatus attached to said camera, said lens apparatus comprising:
a moving lens; and
a driving unit that drives said moving lens on the basis of a first control signal directly output to said lens apparatus and a second control signal output to said lens apparatus via said camera,
wherein said lens apparatus is operable in a compatible mode capable of driving said moving lens by both the first control signal and the second control signal, where movement in accordance with one of the first control signal and the second control signal automatically is made prior to movement in accordance with the other one of the first control signal and the second control signal.

* * * * *

UNITED STATES PATENT AND TRADEMARK OFFICE
CERTIFICATE OF CORRECTION

PATENT NO. : 6,801,259 B2
DATED : October 5, 2004
INVENTOR(S) : Akira Senda

It is certified that error appears in the above-identified patent and that said Letters Patent is hereby corrected as shown below:

Column 3,
Line 7, "only" should read -- Only --.
Line 48, "on element" should read -- one element --.

Column 5,
Line 56, "determined" should read -- is determined --.
Line 59, after "FIG. 3" insert new paragraph as follows:
-- FIG. 6 shows focus control of the remote priority mode. --.

Signed and Sealed this

Fifth Day of July, 2005

JON W. DUDAS
*Director of the United States Patent and Trademark Office*